Feb. 10, 1959
P. W. JOHNSON
2,872,739
GAGING ATTACHMENT FOR TESTING THE CENTRICITY
OF A SURFACE WITH RESPECT TO A
THREAD OR OTHER SURFACE
Filed Dec. 12, 1955
2 Sheets-Sheet 1
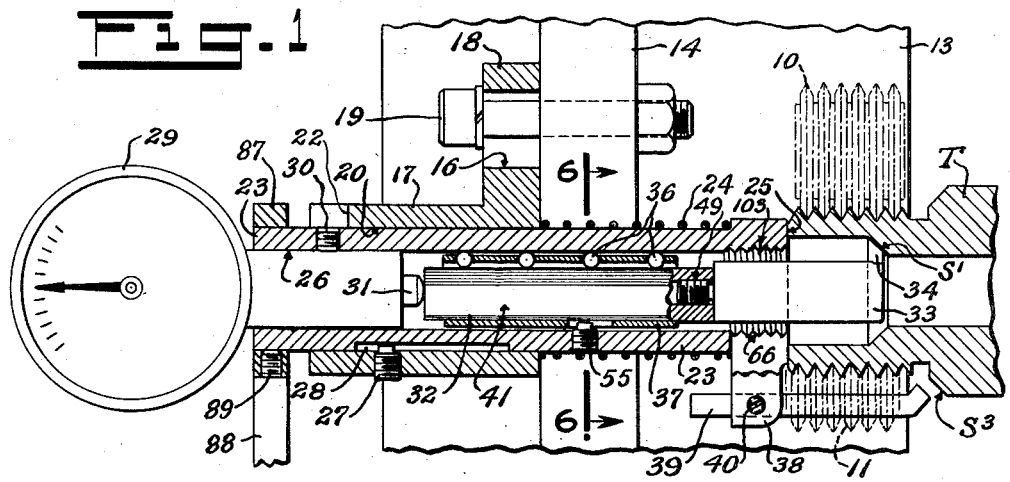
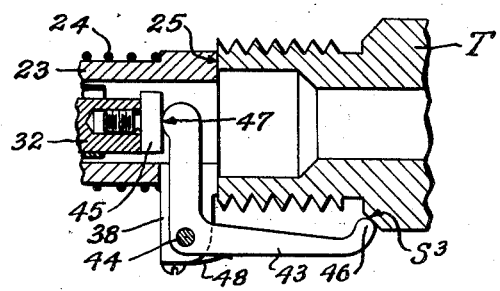
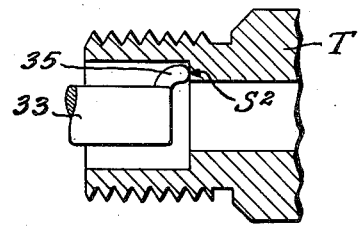
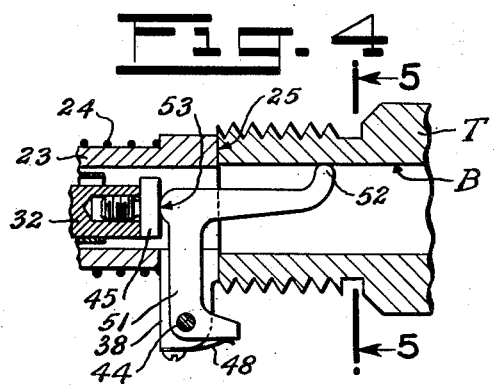
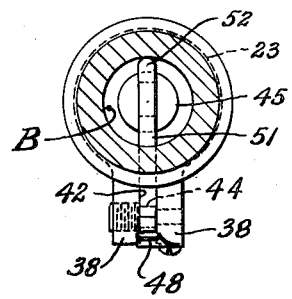
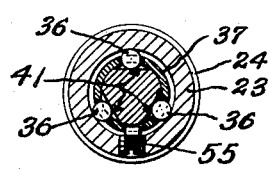
INVENTOR.
PAUL W. JOHNSON
BY
Bohleber, Jassett & Montstream
ATTORNEYS.

Feb. 10, 1959　　　　P. W. JOHNSON　　　　2,872,739
GAGING ATTACHMENT FOR TESTING THE CENTRICITY
OF A SURFACE WITH RESPECT TO A
THREAD OR OTHER SURFACE
Filed Dec. 12, 1955　　　　　　　　　　　　　2 Sheets-Sheet 2
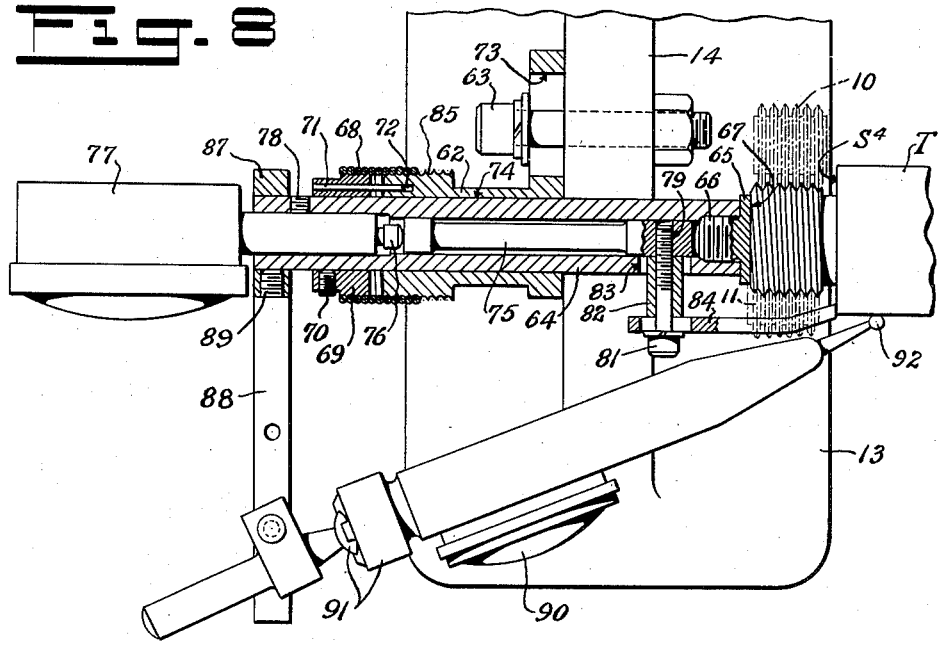
INVENTOR.
PAUL W. JOHNSON
BY
Bohleber, Jassett & Montstream
ATTORNEYS

United States Patent Office 2,872,739
Patented Feb. 10, 1959

2,872,739

GAGING ATTACHMENT FOR TESTING THE CENTRICITY OF A SURFACE WITH RESPECT TO A THREAD OR OTHER SURFACE

Paul W. Johnson, Bloomfield, Conn., assignor to The Johnson Gage Development Company, Bloomfield, Conn., a corporation of Connecticut Application December 12, 1955, Serial No. 552,616

19 Claims. (Cl. 33—199)

The invention relates to an attachment which will test for the squareness or centricity of a surface of a test part with respect to the thread of a threaded test part. The test part is therefore supported on its threads when the squareness or centricity is tested and the support so provided may conveniently be a thread gage which tests for the size of the thread at the same time. The surface to be tested may be an internal or external cylindrical or tapered surface, the centricity of which is to be gaged with respect to the thread or to another taper or cylindrical surface, or may be a surface whose squareness is to be tested with respect to the thread.

It is an object of the invention to construct a simple gaging attachment for testing the centricity or squareness of a surface with respect to the external thread of a test part.

Another object is to construct a gaging attachment which will test the centricity of one surface with respect to another and also with the thread of a test part in which the test part is supported for turning by its thread.

A further object is to construct a gaging attachment which tests for centricity or squareness of an internal surface with respect to an external thread of a test part which can be adapted to test for an exterior surface.

Another object is to construct a new form of gaging attachment using axial relative movement to test for centricity and/or squareness of a surface with respect to a thread on a test part.

A still further object is to construct a gaging attachment which will test for centricity and/or squareness of two surfaces with respect to a thread.

Other objects of the invention will be apparent from the following description when taken in connection with the accompanying drawings illustrating some preferred embodiments thereof in which:

Fig. 1 is a longitudinal section through the gaging attachment for testing the centricity of an internal surface with respect to an external thread on the test part;

Fig. 2 shows a contacting member to be used with the gaging attachment of Fig. 1 for testing the squareness of an internal surface with respect to an external thread;

Fig. 3 is a longitudinal sectional view of a portion of the gaging attachment for testing the centricity of an external surface with respect to the thread;

Fig. 4 is a partial longitudinal section through a portion of the gaging attachment showing a construction for testing the centricity of an internal hole or bore with respect to an external thread of the test part;

Fig. 5 is an end view of the gaging attachment of Fig. 4;

Fig. 6 is a cross section of the attachment taken on line 6—6 of Fig. 1;

Fig. 7 is a view of the gaging end of the attachment of another form of construction for testing an external surface;

Fig. 8 is a modified form of gaging attachment; and

Fig. 9 shows the gaging end of the attachment carrying an adapter such as for use with a spark plug.

The gaging attachment is particularly suited to be used with any form of thread gage which supports the test part T on its threads in gaging position for gaging the accuracy of its external thread. Such a gage may be a roll gage such as the so-called tri-roll gage using ribbed thread rollers 10 and 11. Two forms of this type of gage are illustrated in the Johnson patent application S. N. 257,589, now Patent No. 2,770,050, issued Nov. 13, 1956, and particularly, the forms shown in Figs. 1 and 5. The attachment may also be used with the segmental form of thread gage shown in the Johnson patent application S. N. 299,375 now Patent No. 2,725,637, issued Dec. 6, 1955. Preferably, the thread gage and the attachment herein are mounted upon a base 13 having a vertical flange 14 projecting therefrom to which flange both the thread gage and the centricity attachment herein are mounted with their axes in alignment.

The attachment includes a frame 17 having suitable means for securing the attachment on the flange of the base such as by means of a lug 18 and a bolt 19 passing through a slot 16 for adjustment of the frame. The base, therefore, provides a means for securing the attachment to the thread gage. The frame has a suitable guide such as a hole 20 therethrough. A hollow sleeve 23 is slidably mounted in the guide or hole and a spring means 24 resiliently propels the sleeve towards the test part, that is, to the right as shown in Fig. 1. The contacting surface on the end or the anvil 25 of the sleeve is square with respect to the axis thereof and is at least substantially continuously circular through 360°. This contacting surface on the end of the sleeve engages the end of the test part T. With the end of the sleeve being completely circular or substantially so, it is immaterial whether or not the end of the test piece is square. The sleeve has a slideway in the form of a bore 26 therethrough. Suitable means may be provided to prevent rotation of the sleeve in the guide 20, the means shown being a key 27 carried by the frame extending into a slot 28 in the sleeve.

The other end of the axially movable sleeve 23 carries a suitable indicator 29 secured thereto such as within the bore 26 by a screw 30. The indicator may be of the dial type having a pointer movable over a dial. It has a contactor 31 which is pressed outwardly by spring means in the indicator. Engagement of the contactor moves the pointer over the indicator dial. The contactor of the indicator is engaged by a push pin or rod 32 which is freely movable axially within the bore of the sleeve. The other end of the push pin carries a contact element 33 shown particularly as threaded into a threaded hole 49 in the end of the push pin although it may be integral therewith. In order to secure free axial movement of the push pin within the sleeve it is preferably mounted on ball bearing means including balls 36 held in place by a retainer 37. The push pin is retained against rotation, however, the ball bearing means may serve this additional function. The push pin has longitudinally extending ball tracks, such as flats 41, three being shown. A screw 55 carried by the sleeve engages a slot in the ball retainer to hold the same in place. The contact element 33 carries a finger 34 for engaging the internal surface S1, the centricity of which is to be gaged with respect to the thread of the test part. This finger may have an inclined surface for contact with a taper surface S1 so that a ridge or other fault will be revealed as well as its centricity.

The hollow sleeve 23 may carry a bracket at the indicator end thereof including a collar 87 secured thereto, and a column 88 carried by the collar. The column may have a screw 89 on the end thereof which is received in a threaded hole in the collar. The end of the screw may engage the hollow sleeve 23 to clamp the bracket thereto. This bracket carries an indicator which will be more fully described in connection with Figure 8.

In using the attachment of Figure 1, it is mounted so that the axis of the sleeve or push pin of the attachment is in axial alignment with the axis of the test part or with the gaging axis of the thread gaging members of the thread gage. The sleeve is pulled to the left against the pressure of the spring 24 to remove it from the gaging area whereupon a test part T is inserted into the thread gaging members such as the rollers 10 and 11. The attachment is then released so that the contact element 33 is projected into the test part with the anvil 25 abutting the end of the test part. The finger of the contact element is propelled into contact with the surface S1 by the spring mechanism of the indicator on the contactor 31. With the test part in the thread gage, the thread is tested as to its allowable tolerances.

In order to test the centricity of the surface S1 with respect to the thread, the test part is rotated within the thread gage. Because of the thread on the test part, it is advanced to the left, or retreats to the right as viewed in Fig. 1. The contact of the anvil 25 of the sleeve with the end of the test part, however, moves the sleeve, the push pin and the indicator therewith so that the advance or retreat of the test part gives no reading on the indicator 29. If, however, the surface S1 is eccentric with respect to the thread, the contact element 33 and push pin 32 will move relatively to the sleeve and the extent of the movement, as shown on the indicator, will indicate the eccentricity of the conical surface S1 with respect to the thread. A full turn of the test part assures that a proper test of centricity has been made.

In Fig. 2, the contact element is shown with a finger 35 of rounded form so that it may contact a surface S2 and test the squareness of this surface with respect to the thread. This form of finger is also suitable for testing the centricity of the taper surface S1.

It may be desirable or required to test the centricity of the internal taper surface S1 with an external taper surface S3. This is accomplished by an arm 38, carried by the sleeve 23 adjacent the contacting surface or anvil 25 which arm carries a contact element or bar 39 secured to the arm such as by a screw 40. This screw is loosened and the contact element 39 is advanced so that the end thereof engages the external taper surface S3 and removes the anvil 25 from contact with the end of the test part. The screw 40 is then tightened. The position of the finger 34 may require adjustment also by adjusting the position of the indicator within the sleeve. In this setting, it is the contact element 39 which advances or retracts the sleeve, push pin and indicator by contact with the surface S3 when the test part advances or retreats when it is rotated. Since the contact element 39 rides upon the surface S3, any reading of the indicator from the relative movement of the finger 34 will indicate the eccentricity of these two conical surfaces with respect to each other. No indicator movement will show concentricity. If the internal surface S1 has already been tested as being concentric with the thread, then this test also will indicate the centricity of the surface S3 with respect to the thread. The contact element 39 is of bar form so that it passes between the gaging members such as the rollers of the thread gaging means. The end of the bar is narrow to engage a relatively small part of the surface S3. The end or contacting surface 25 of the sleeve or the contact element 39 is, therefore, means for engaging a surface of the test part.

Fig. 3 illustrates a construction for testing directly the centricity of the surface S3 with respect to the thread. The test part is mounted within the thread gaging members as in Fig. 1. In this construction, a contacting element or bell crank lever 43 is pivotally mounted between its ends on a pivot 44 carried by an arm such as the arm 38 of the sleeve. The lever may be mounted in a slot 42 through the arm and sleeve as shown in Fig. 5. This slot does not materially alter the continuity of the circular contacting means or anvil 25 so that it is substantially circular. The contacting element 33 may be removed and replaced by a plate 45 or the push pin 32 may be replaced by one of the same length as the pin 32 and plate 45. One end of the lever carries a finger 46 for engaging the surface S3 and the other end of the lever is operatively connected with the push pin such as by engaging the plate 45. The lever may have a curved surface 47 for engaging the push pin.

In using the attachment of Fig. 3, the test part is rotated while supported in the thread gaging members which advances or retracts the test part, and hence, advances or retracts the sleeve 23, the lever 43, and the push pin 32 so that such advance or retreat of the test part does not affect the indicator. If, however, the surface S3 is eccentric with respect to the thread, the lever 43 will be oscillated and shift the push pin 32, which movement will be indicated on the indicator and measure the eccentricity. A spring 48 carried by the arm 38 retains the lever in contact with the surface S3. This construction serves equally well to test the centricity of a cylindrical external surface with respect to the thread.

Fig. 4 shows an attachment similar to that of Fig. 3 excepting that a contacting element or lever 51 is pivotally mounted at one end thereof on the pivot 44 carried by the sleeve or arm 38. The other end has a finger 52 extending into the bore of the test part. This lever is operatively connected with the push pin between the ends thereof such as by engaging the push pin 32 or particuarly, the plate 45 thereof. The lever having an elbow or the like may have a curved surface 53 engaging the push pin. The spring 48 retains the end of the lever or finger 52 in contact with the bore B of the test part. The end of the test part engages the contacting surface or anvil 25 of the sleeve so that the sleeve and the indicator advance or retreat when the test part is rotated in the thread gaging members and hence, the indicator gives no indication of this advance or retraction. If, however, the surface or bore B of the test part is eccentric with respect to the thread, this eccentricity will pivot the lever 51 when the test part is rotated, which pivoting will shift the push pin 32 relatively to the sleeve and move the indicator contactor and pointer. The movement of the indicator pointer will indicate the extent of eccentricity of the bore with respect to the thread.

It is desirable that the ratio of the distances between each contact finger 46 and 52 of the levers of Figs. 3 and 4 and the axis of the pivot 44 and of the distance between the point of contact of the lever with the pin 32 and the axis of the pivot 44 be one to one or some whole number. This will avoid any need for special dials on the indicator or any need to calculate the actual eccentricity from the dial reading.

In the gaging attachment of Fig. 1, the contacting element 33 is carried by the push pin. In the attachments of Figs. 3 and 4, the contacting elements or levers 43 and 51 are carried by the sleeve 23 but engage or are operatively connected with the push pin. In both constructions, the contacting elements are carried by one of the parts including the push pin and the sleeve or are carried by the attachment and associated with the push pin to give movement thereto relatively to the sleeve.

Figure 7 shows a modification of the construction of Figure 3 wherein an external surface may be tested with respect to a screw thread utilizing relative movement of the push pin 32 with respect to the hollow sleeve 23. In this construction, a finger means includes a post 58 secured at the end of the push pin such as by means of a screw 59 which is received in a threaded hole in the end of the pin. This post projects through the slot in the arm 38. A contact element in the form of a finger 60 is secured to the post by a screw 61. The end of the contact finger engages the surface to be tested shown particularly as a beveled surface S3.

When the test part is rotated in a thread gage, it moves axially in the gage and propels the hollow sleeve axially therewith against the pressure of spring 24 so that without more, there would be no indication on the indicator 29. If, however, there is some eccentricity of the surface S3 with respect to the thread or axis of the thread of the test part then, with the finger 60 engaging this surface, there will be some relative movement of the push pin with respect to the hollow sleeve which movement will shift the contactor 31 of the indicator 29 and the indicator pointer will move to indicate eccentricity and the amount of eccentricity which exists between the surface S3 and the thread of the test part.

Figure 8 illustrates another form of the attachment whereby the squareness or centricity of two external surfaces may be gaged with respect to a threaded test part. The attachment is shown mounted on the base 13 which base usually will carry thread gaging means shown illustratively as gaging rollers 10 and 11. The attachment includes a frame 62 which is secured to the base 13 in any suitable manner such as by a bolt 63 extending through a slot 73 in the frame which enables adjustment of the position of the attachment with respect to the base and a thread gage. The frame has a guide therethrough which is shown particularly as a cylindrical bore 74.

In the guide of the frame is mounted a hollow sleeve 64 which is movable axially therein. The end of the sleeve or attachment which contacts the test part may carry a contacting member 65 which is threadedly received in the thread 66 in the end of the sleeve. The contacting member has a contacting surface 67 which engages the end of the test part T so that when the test part T is turned and moves axially within the thread gaging members, the hollow sleeve is moved axially therewith. The contact surface 67 is square with respect to the axis of the sleeve so that the axial movement of the sleeve is unaffected by any lack of squareness of the end of the test part engaging the same. The hollow sleeve is projected towards the test part or toward the right as shown in Figure 8 by suitable means illustrated as a coil spring 68. This coil spring is attached at one end to the frame such as by a screw thread 85 which receives the coils thereof and the other end is attached to a collar 69 fastened to the hollow sleeve such as by a screw 70. This spring is a tension spring in that it is the contraction of the spring which propels the hollow sleeve toward the test part or to the right as shown in the figure. Means are provided to keep the hollow sleeve from rotation within the guide 74 which means is shown particularly as a slide pin 71 carried by the collar and sliding in a hole 72 in the end of the frame.

A push pin 75 is received in the hollow sleeve and is movable axially therein. At the indicator end or left-hand end of the push pin, the pin is adapted to engage the contactor 76 of the indicator 77, shown particularly as a dial indicator. The stem of the dial indicator is received within the bore of the hollow sleeve and is secured thereto by a set screw 78. The other end of the push pin has a threaded hole 79 for securing a finger means thereto. The finger means comprises a bolt 81 which is threaded into the hole 79 and secures a post 82 thereto which post projects through a slot 83 in the hollow sleeve. A contact element or finger 84 is adjustably mounted on the post and is adapted to engage a surface of the test part, the squareness or centricity of which is to be tested with respect to the thread of the test part. The illustration shows a square shoulder S4, however, the contact finger may just as well engage a beveled surface as shown in Figures 3 and 7. The post 82 engages the side walls of the slot 83 so that the push pin is retained against rotation within the hollow sleeve by the post. The post, therefore, serves a double function in that it retains the push pin against rotation and also serves as a mounting for the contact finger 84 upon the push pin.

It is sometimes desirable to test a second surface of the test part. To this end, the hollow sleeve may carry means to mount a second indicator on the sleeve. In the construction of Figure 8, this means includes a bracket mounted at the indicator end of the sleeve and includes a collar 87 which receives a column 88 having a screw threaded end 89. This threaded end is screwed into a threaded hole in the collar so that the end of the column engages the hollow sleeve and clamps the collar and the column thereto. A second indicator 90 is mounted upon the bracket or the column 88 thereof, the form of the mounting being unimportant although it is desirable that the mounting include a ball and socket joint 91 so that the indicator may be shifted or adjusted to bring the contactor 92 into engagement with the second surface to be gaged such as the outer cylindrical surface with respect to the thread of the test part. The indicator 90 is shown particularly as providing a test for the centricity of an external surface of the test part with respect to the thread.

In the operation of the gaging attachment of Figure 8, the test part is rotated in its support or thread gage so that it advances or retreats axially because of the screw threads. The hollow sleeve 64 advances or retreats therewith under the influence of the spring carrying the indicators 77 and 90 therewith as well as the contacting finger 84. If the surface S4 is not square with respect to the thread, the finger and push pin 75 move axially relatively to the sleeve which movement appears on the indicator 77. If the surface engaged by the contactor 92 of the indicator 90 is not concentric to the thread, this will appear on the indicator 90. The centricity of two surfaces with respect to the thread of a test part is therefore gaged.

Figure 9 shows the gaging attachment having a rotatable contacting member 95 carried on the end of the hollow sleeve 64 which carries a contacting surface 96 for engaging the end of a test part having a protruding part such as spark gap wires of a spark plug S. P. The contacting member 65 is removed from the end of the hollow sleeve of Figure 8 and an adapter 97 is threaded into the threads 66. The adapter has a threaded hole 98 which receives a stud 99. This stud has a bearing 100 upon which the contacting member 95 is rotatable. The contacting member has a groove 101 extending inwardly from the contacting face 96 for receiving the protruding part upon the test part. The other parts of the attachment are the same as shown in Figure 8. This rotatable contacting member may be mounted on the threads 103 of the sleeve of the attachment of Figure 1.

Upon rotation of the test part S. P. when supported on its threads in a thread gage, the rotatable contacting member 95 rotates therewith which does not affect the contact of the contacting surface 96 with the test part so that the hollow sleeve moves axially with the test part when it is rotated unaffected by any lack of squareness or other irregularity of the end of the test part. Any eccentricity of the surface S3 with respect to the thread of the test part will cause relative movement of the contact finger 84' and the push pin 75 with respect to the hollow sleeve 64 which movement will actuate the contactor 76 and pointer of the indicator 77.

In all constructions illustrated, the hollow sleeve is shown particularly as being formed with a central bore therethrough to receive a push pin and permit relative axial movement of the latter with respect to the sleeve. The hollow sleeve forms a guideway or slide for the pin and any other form of guideway within the sleeve is contemplated.

Out of squareness of a surface is in effect, the same as the eccentricity of a beveled or cylindrical surface. For a squared shoulder such as S2 or S4, its angularity with respect to the thread of the test part is 90° whereas a cylindrical surface has an angularity of 0° with respect thereto and a beveled surface has an angularity anywhere between these two limits. The eccentricity of a beveled surface may be one in which the axis of the bevel does not coincide with the axis of the thread or it may be one in which the axis of the bevel is at an angle with respect to that of the thread. The term centricity, therefore, includes out of squareness of a surface relatively to a thread of a test part. The indicator 90 may be adjusted, too, so that its contactor 92 engages such surfaces or this particular indicator may be substituted for one having a contactor adapted for contact with the surface to be engaged.

In the constructions of Figures 1, 2, 7, 8 and 9, the contact element or finger means 33, 60, 84, and 84' are carried by the push pin. In the constructions of Figures 3 and 4, the contacting elements 43 and 51 are carried by the sleeve 23. In both constructions, the contacting means is carried by one of the parts including the push pin and the sleeve and is associated with or operatively connected with the push pin. In each of the constructions illustrated, the contacting element or finger means has a relatively small dimension for engagement of a relatively small area of the surface, the relative centricity of which is to be tested or gaged.

In the forms of attachment illustrated, the hollow sleeve includes anvil means which engages the test part to propel the sleeve axially with the threaded test part when it is turned in the thread gaging means. The anvil means in the various figures includes the surface or anvil 25 of the sleeve in Figure 1 as well as the contacting member 39 when brought into contact with the surface S3. The anvil means of Figure 8 is the contacting member 65 with its surface or anvil 67. In Figure 9 the rotatable member 95 with its surface 96 constitutes the anvil means.

The gaging attachment also provides a test of the dimension of a conical or cylindrical part as well as centricity. The dial reading will give a comparative reading of the diameter as compared with a master part to which the indicator is set.

This invention is presented to fill a need for improvements in a gaging attachment for testing centricity of a surface with respect to a thread or other surface. It is understood that various modifications in structure, as well as changes in mode of operation, assembly and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and means retaining the push pin against rotation and associated with said other end of the push pin to move the same axially relatively to the sleeve and of a relatively small dimension to engage a surface of the test part to be gaged.

2. A gaging attachment adapted to be used with a thread gage for testing the squareness or centricity of a surface on an externally threaded test part with respect to the thread or another surface comprising a frame having a guide therein, a hollow sleeve slidably received in the guide and adapted to receive an indicator within one end thereof, a contacting surface on the other end of the sleeve of at least substantially full circular extent, means retaining the sleeve against rotation in the guide, spring means propelling the sleeve axially in the guide, a push pin slidable axially within the hollow sleeve having an end adjacent the contacting surface of the sleeve, means retaining the push pin against rotation in the sleeve, and means carried by one of the parts including the push pin and the sleeve adjacent to the contacting surface of the sleeve to engage a surface to be gaged.

3. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve having a squared surface at least substantially circular to engage the end of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, means retaining the push pin against rotation, and means associated with said other end of the push pin to move the same axially relatively to the sleeve and adapted to engage a surface of the test part to be gaged.

4. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin within the hollow sleeve having one end adapted to engage the indicator contactor and having the other end adjacent the other end of the sleeve, ball bearing means mounting the push pin for axial movement and for retaining the push pin against rotation, and means associated with said other end of the push pin to engage a surface of the test part to be gaged.

5. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, means retaining the push pin against rotation, and means carried by said other end of the push pin to engage an internal surface to be gaged.

6. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting bar having a relatively narrow end carried by the other end of the sleeve and adapted to contact a short portion of a taper surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, means retaining the push pin against rotation, and means carried by said other end of the push pin to engage an internal surface of the test part to be gaged.

7. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and a lever pivotally mounted on said other end of the sleeve and operatively connected with the push pin, the lever adapted to engage a surface of the test part to be gaged.

8. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and a lever pivotally mounted at one end to said other end of the sleeve and operatively connected between its ends to the push pin, the other end of the lever being adapted to engage an internal surface of the test part to be gaged.

9. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and a lever pivotally mounted between its ends to said other end of the sleeve and one end of the lever engaging said other end of the push pin, the other end of the lever being adapted to engage an external surface of the test part to be gaged.

10. A gaging attachment adapted to be used with a thread gage for testing squareness or centricity of a surface of an externally threaded test part with respect to the thread or another surface comprising a frame having a guide therein, a hollow sleeve slidably received in the guide, an indicator having a stem received within one end thereof, and having a contactor, a contacting means carried by the other end of the sleeve adapted to contact a surface of the test part, means retaining the sleeve against rotation in the guide, a push pin mounted for axial movement within the hollow sleeve having one end engaging the indicator contactor and having the other end adjacent the other end of the sleeve, means retaining the push pin against rotation, and means associated with said other end of the push pin to move the same axially relatively to the sleeve and adapted to engage a surface of the test part to be gaged.

11. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, means retaining the push pin against rotations, and means associated with said other end of the push pin to move the same axially relatively to the sleeve and adapted to engage a surface of the test part to be gaged.

12. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, a contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, means retaining the push pin against rotation and associated with said other end of the push pin to move the same axially relatively to the sleeve and of a relatively small dimension to engage a surface of the test part to be gaged, and a bracket carried by the hollow sleeve for mounting a second indicator.

13. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, contacting means rotatably mounted on the other end of the sleeve adapted to contact a surface of the test part, and having a slot in the end thereof, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and means retaining the push pin against rotation and associated with said other end of the push pin to move the same axially relatively to the sleeve and of a relatively small dimension to engage a surface of the test part to be gaged.

14. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, the hollow sleeve having a slot extending therethrough at the other end thereof, contacting means carried by the other end of the sleeve having a substantially circular and square end adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and finger means carried by the other end of the push pin to move the same axially relatively to the sleeve and extending through the slot in the hollow sleeve and retaining the push pin and finger means against rotation, the finger means including a finger of a relatively small dimension to engage a surface of the test part to be gaged.

15. A gaging attachment as in claim 14 including bracket means carried by the sleeve and adapted to support an indicator thereon.

16. A gaging attachment as in claim 14 in which the contacting means includes a contacting member rotatably mounted on the end of the sleeve, the contacting member having a slot extending from the end thereof.

17. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, contacting means carried by the other end of the sleeve adapted to contact a surface of the test part, means retaining the sleeve against rotation in the guide, spring means propelling the sleeve axially in the guide, a push pin within the hollow sleeve having one end adapted to engage an indicator contactor and having the other end adjacent the other end of the sleeve, finger means carried by the other end of the push pin to move the same axially relatively to the sleeve, ball bearing means mounting the push pin within the sleeve for axial movement and retaining the push pin against rotation, the finger means including a finger of a relatively small dimension to engage a surface of the test part to be gaged.

18. A gaging attachment as in claim 17 in which the ball bearing means includes balls and a retainer for the balls, means to hold the retainer against rotation with respect to the sleeve, and a ball track for the balls extending longitudinally of the push pin.

19. A gaging attachment adapted to be used with a thread gage for testing squareness or centricity of a surface of an externally threaded test part with respect to the thread or another surface comprising a frame having a guide therein, a hollow sleeve slidably received in the guide and adapted to receive an indicator within one end thereof having a contactor, contacting means carried by the other end of the sleeve adapted to contact a surface of the test part, means retaining the sleeve against rotation in the guide, spring means propelling the sleeve axially in the guide, a push pin mounted for axial movement within the hollow sleeve having one end adapted to engage the indicator contactor and having the other end adjacent the other end of the sleeve, and means associated with said other end of the push pin to move the same axially relatively to the sleeve and of a relatively small dimension to engage a surface of the test part to be gaged.

References Cited in the file of this patent

UNITED STATES PATENTS

| | | |
|---|---|---|
| 2,400,293 | Dunn | May 14, 1946 |
| 2,630,633 | Webb | Mar. 10, 1953 |
| 2,725,637 | Johnson | Dec. 6, 1955 |